United States Patent [19]

Rudat

[11] Patent Number: 5,757,651
[45] Date of Patent: May 26, 1998

[54] PROCESS FOR OBTAINING TRIGGERING SIGNALS BY THE COMPARISON OF CURRENTS AT THE ENDS OF A POWER TRANSMISSION PATH

[75] Inventor: Lothar Rudat, Dortmund, Germany

[73] Assignee: Siemens Aktiengesellschaft, Munich, Germany

[21] Appl. No.: 392,998
[22] PCT Filed: Aug. 25, 1993
[86] PCT No.: PCT/DE93/00791
§ 371 Date: Mar. 6, 1995
§ 102(e) Date: Mar. 6, 1995
[87] PCT Pub. No.: WO94/06189
PCT Pub. Date: Mar. 17, 1994

[30] Foreign Application Priority Data

Sep. 7, 1992 [DE] Germany ............... 42 30 059.2

[51] Int. Cl.$^6$ ................................. H02H 7/26
[52] U.S. Cl. .................. 364/487; 361/87; 364/492
[58] Field of Search ................. 361/44, 63, 87, 361/93, 97; 364/483, 724.01, 492, 487, 572; 340/635, 644, 664; 324/509, 512, 522

[56] References Cited

FOREIGN PATENT DOCUMENTS 0 198 684  10/1986  European Pat. Off. .
0 348 673   1/1990  European Pat. Off. .

OTHER PUBLICATIONS

Elektrie, vol. 45, No. 7, 1991, Berlin, DD, pp. 272–276; G. Koch et al.: *Ein numerischer Stromvergleichsschutz mit digitaler Messwertübertragung über Lichtwellenleiter.*

Primary Examiner—James P. Trammell
Assistant Examiner—Tony M. Cole
Attorney, Agent, or Firm—Kenyon & Kenyon

[57] ABSTRACT

The invention relates to a differential protective system for electric power transmission paths where measurement quantities obtained from the currents at either end of the section to be monitored are digitized and subjected to digital sine filtering. Sign signals are obtained from auxiliary measured quantities generated from the filtered current measurement values and taken to both ends of the section to be monitored for evaluation with the generation of an exciting signal. To make the system largely unaffected by frequency variations in the currents, further filtered current measurement values are obtained by cosine filtering; from those values and from the individual filtered current measurement values, a measurement quantity is generated by absolute value generation and low-pass filtering. This measurement quantity causes a further exciting quantity to be established using an absolute value comparison quantity. If both exciting signals are present, the sign signals are evaluated.

4 Claims, 3 Drawing Sheets

| $S_{(t)}$ | $V_{p(t)}$ | $V_{n(t)}$ | $G_{p(t)}$ | $G_{n(t)}$ | $Z_{(t-1)}<0$ | $Z_{(t-1)}=0$ | $Z_{(t-1)}>0$ |
|---|---|---|---|---|---|---|---|
| 0 | x | x | x | x | $Z_{(t)}=Z_{(t-1)}+1$ | | $Z_{(t)}=Z_{(t-1)}-1$ |
| 1 | 1 | 0 | 1 | 0 | | $Z_{(t)}=Z_{(t-1)}-8$ | |
| 1 | 1 | 0 | 0 | 0 | | $Z_{(t)}=Z_{(t-1)}-4$ | |
| 1 | 1 | 0 | 0 | 1 | | $Z_{(t)}=Z_{(t-1)}+7$ | |
| 1 | 0 | 0 | 1 | 0 | | $Z_{(t)}=Z_{(t-1)}-4$ | |
| 1 | 0 | 1 | 0 | 1 | | $Z_{(t)}=Z_{(t-1)}-4$ | |
| 1 | 0 | 1 | 1 | 0 | | $Z_{(t)}=Z_{(t-1)}+7$ | |
| 1 | 0 | 1 | 0 | 0 | | $Z_{(t)}=Z_{(t-1)}-4$ | |
| 1 | 0 | 0 | 0 | 1 | | $Z_{(t)}=Z_{(t-1)}-8$ | |

FIG. 5

PROCESS FOR OBTAINING TRIGGERING SIGNALS BY THE COMPARISON OF CURRENTS AT THE ENDS OF A POWER TRANSMISSION PATH

This application is a 371 of PCT/DE93/00791 filed Aug. 25, 1993.

BACKGROUND OF THE INVENTION

The invention relates to a process for obtaining triggering signals by the comparison of currents at the ends of a section to be monitored of an electric power transmission path. More particularly, the present invention relates to a process for obtaining triggering signals where at both ends of the section to be monitored the measurement quantities obtained from the currents are phase-selectively digitized, digital current measurement values are obtained, and from which subsequently filtered current measurement values are obtained by sine filtering. A stored reference current measurement value is subtracted from the present filtered current measurement value, forming an auxiliary measurement quantity. A sign signal denoting the sign of the current auxiliary measured quantity is retained for evaluation at one end and is also transmitted through a data transmission path for evaluation to the other end of the section to be monitored. An exciting quantity providing the current evaluation is obtained if the auxiliary measured quantity is greater than a previously determined threshold value.

A known process of this type is described in the Siemens Differential Current Protection System 7 SD 51 and its basic process steps are described in the journal "Elektrie," 45(1991)7, pp. 272–276. This current differential protection system is a fast-acting selective short-circuit protection system for cables or aerial lines which form power transmission paths. In this current differential protection system, the direct components contained in the monitored current are suppressed and the harmonics dampened. Also, in this differential protection system, a filtered current measurement value, detected two periods of the current earlier on the transmission path, or a predefined current threshold value is used to build the auxiliary measured quantity. The sign signals, formed at both ends of the section to be monitored of the electric power transmission path from the auxiliary measured quantities, are compared at either end as long as the auxiliary measured quantity is greater than a predefined threshold value. Depending on the sign of the sign signals that are compared to each other, a triggering counter is activated during evaluation; this activation occurs by addition or subtraction of constants having different values depending on whether the comparison results in the need for quick triggering or for a high degree of stabilization.

An object of the present invention is to configure the process described above so that it operates with a high degree of reliability even when the current frequency on the section to be monitored of an electric power transmission path changes relatively quickly.

SUMMARY OF THE INVENTION

This and other objects are achieved by the method of the present invention. The present invention provides for subjecting the digital current values to digital cosine filtering at both ends of the section to be monitored, thus additional filtered current values are obtained. An absolute value measurement quantity is generated from the first and additional filtered current values through absolute value generation and low-pass filtering. A stored absolute value reference measurement quantity is subtracted from the actual value of the absolute value measurement quantity, thus an absolute value comparison quantity is generated. The absolute value comparison quantity is compared to a predefined threshold value and another exciting quantity is produced if the absolute value of the absolute value comparison quantity is greater than the threshold value. Also, the sign signal with the corresponding sign signal from the other end of the section to be monitored are evaluated if both exciting quantities are present.

An important advantage of the process of the invention is its considerable independence with respect to frequency. This means that even in the case of relatively rapid frequency changes in the current on the section to be monitored of an electric power transmission path, the sign signals are only evaluated on the basis of the simultaneous presence of both exciting quantities if actual currents of the order of magnitude of short-circuit currents flow through the section to be monitored. This is explained by the fact that in the process of the invention, an absolute value measurement quantity is generated in addition to the auxiliary measurement quantity used for generating an absolute value comparison quantity using a stored absolute value reference measurement quantity; the reference measurement quantity is largely independent of the frequency changes in the currents on the section to be monitored. The second exciting quantity is obtained by comparing the absolute value comparison quantity with a predefined threshold value. This second exciting quantity is thus also largely independent of the frequency changes in the currents on the section to be monitored. Hence, the process of the present invention ensures that when a second exciting quantity is present in addition to the first exciting quantity, the sign signal is actually evaluated only due to flowing short-circuit currents.

In the process of the present invention, different absolute value measurement quantities can be used as absolute value reference measurement quantities. For sufficiently reliable operation, however, the use of an absolute value measurement quantity detected two periods of the current earlier is considered to be advantageous if this absolute value measurement quantity is smaller than a predefined absolute value threshold value; if the absolute value measurement quantity is greater than a predefined absolute value threshold value, the predefined absolute value threshold value is used as the absolute value reference measurement quantity.

In order to further enhance the reliability of the process according to the present invention, the first exciting quantity is suppressed if the difference between a present digital current measurement value and a previous, stored digital current measurement value is smaller than a predefined minimum value. This allows one to safely determine whether or not the section to be monitored of the electric power transmission path should be considered de-energized; by suitably choosing the predefined minimum value it is ensured that interference will not affect the result.

BRIEF DESCRIPTION OF THE DRAWINGS

FIG. 5 is a diagram further illustrating the mode of operation of the process according to the present invention.

DETAILED DESCRIPTION

Figure 1:
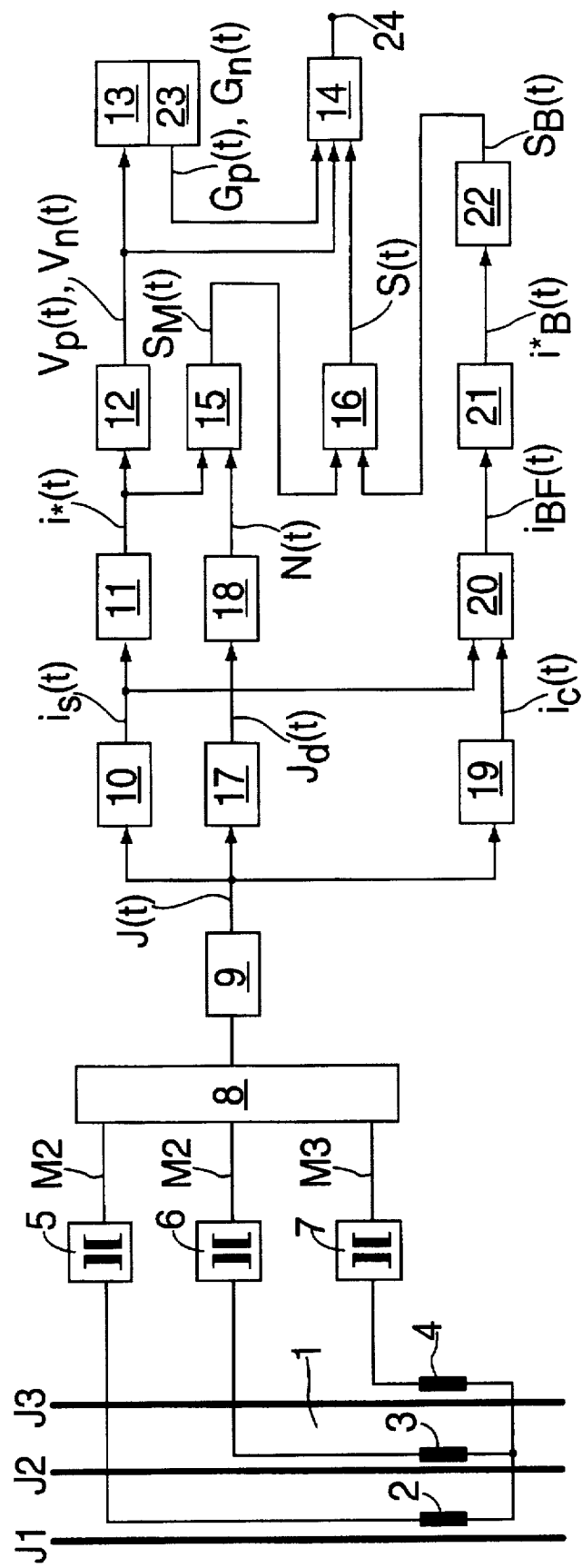
FIG. 1 is a block diagram of an arrangement for implementing the process according to the present invention.

As shown in FIG. 1, currents J1, J2, and J3 of a section 1 to be monitored of an electric power transmission path (otherwise not illustrated here) are detected by transducers 2, 3, and 4. Measurement quantities M1, M2, and M3, obtained from currents J1, J2, and J3 are supplied, via additional matching transducers 5, 6, and 7 to a multiplexer 8, followed by an analog-to-digital converter 9. Thus, digital current values J(t) are obtained at the output of this converter 9.

These digital current measurement values J(t) are subjected to sine filtering in a sine filter 10, so that filtered current measurement values $i_s(t)$ are obtained at the output of this sine filter 10. These values $i_s(t)$ can be described by the following equation (1)

$$i_s(t)=i_s(t-1)+J(t)-2J(t-\tfrac{1}{2}T)+J(t-T) \quad (1)$$

Figure 2:
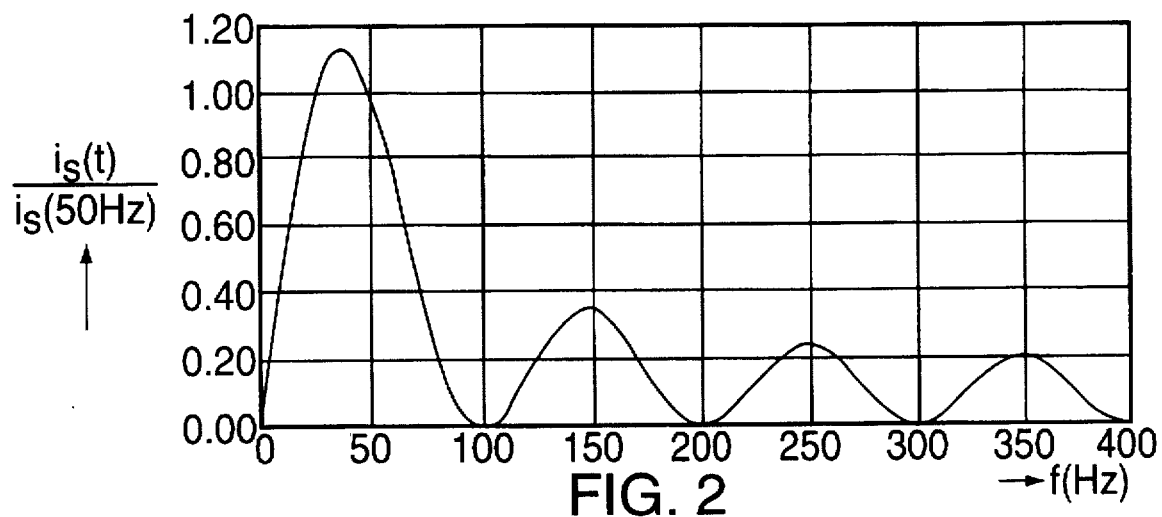
FIG. 2 shows the frequency response of the sine filtering performed in FIG. 1.

In this equation, T provides the period of currents J1 through J3 in section 1 to be monitored. The frequency response of sine filter 10 is shown in FIG. 2.

The present filtered current measurement values, $i_s(t)$, are further processed in a modifying module 11 so that a stored current reference measurement value is obtained from the present filtered current measurement value, while an auxiliary measurement quantity i*(t) is generated simultaneously.

The auxiliary measuring quantity i*(t) is given by the following relationship (2):

$$i^*(t)=i_s(t)-i_s(t-2T) \quad (2)$$

if relationship (3) exists:

$$-I_{thresh}<i_s(t-2T)<+I_{thresh}. \quad (3)$$

In this equation (3), the quantity $I_{thresh}$ provides a predefined threshold value whose value is selected in conformance with the maximum load current of the line to be protected.

If the stored absolute value current measurement reference value satisfies the following relationship (4)

$$i_s(t-2T)>+I_{thresh}, \quad (4)$$

then the auxiliary measuring quantity i*(t) is defined by the following relationship (5):

$$i^*(t)=i_s(t)-I_{thresh}. \quad (5)$$

If the stored absolute value current measurement reference value satisfies the following relationship (6):

$$-I_{thresh}>i_s(t-2T). \quad (6)$$

then the auxiliary measuring quantity is defined by the following equation (7):

$$i^*(t)=i_s(t)+I_{thresh}. \quad (7)$$

The auxiliary measuring quantities generated in this manner are checked in a sign builder 12 for their sign, and sign signals $V_p(t)$ and $V_n(t)$ are generated; these signals have the value "1" if the following relationships exist (equations (8) and (9)):

$$V_p(t)=1 \text{ if } i^*(t)>+I_{sign} \quad (8)$$

$$V_n(t)=1 \text{ if } i^*(t)<-I_{sign}. \quad (9)$$

$I_{sign}$ represents a threshold for determining the direction of the current and is selected analogously to similar threshold quantities used in known phase comparison devices which also evaluate a current direction using operational signs, but which, instead of the amount I*(t), use the measured current I(t) directly.

Sign signals $V_p(t)$ and $V_n(t)$ are supplied to a data transmission section 13 and an evaluation block 14. As further illustrated in FIG. 1, the auxiliary measurement quantity i*(t) is supplied to a threshold value device 15, where it is determined whether the auxiliary measurement quantity i*(t) exceeds a predefined threshold value. An exciting quantity $S_M(t)$ appears at the output of threshold value device 15 if the following conditions defined by equations (10) and (11) below are satisfied:

$$S_M(t)=1 \text{ if } i^*(t)>+I_{prot.thresh}. \quad (10)$$

$$S_M(t)=1 \text{ if } i^*(t)<-I_{prot.thresh}. \quad (11)$$

The variable $I_{prot.thresh}$ represents an initial threshold for the protection process of the present invention.

The exciting quantity $S_M(t)$ is supplied to another threshold value device 16.

As shown in FIG. 1, the analog-to-digital converter 9 is followed by a low-pass filter 17, where the digital current value J(t) is filtered, and a difference is generated between the present digital current measurement value J(t) and a previous, stored digital current measurement value. An output value $J_d$ is thus obtained, which is supplied to a recognition module 18. In this recognition module 18, it is checked whether this additional quantity $J_d$ is smaller than a predefined minimum value. If it is not smaller than the minimum value, a signal N(t) is supplied to threshold value device 15, whereupon the first exciting quantity $S_M(t)$ is forwarded to the second threshold value device 16.

Figure 3:
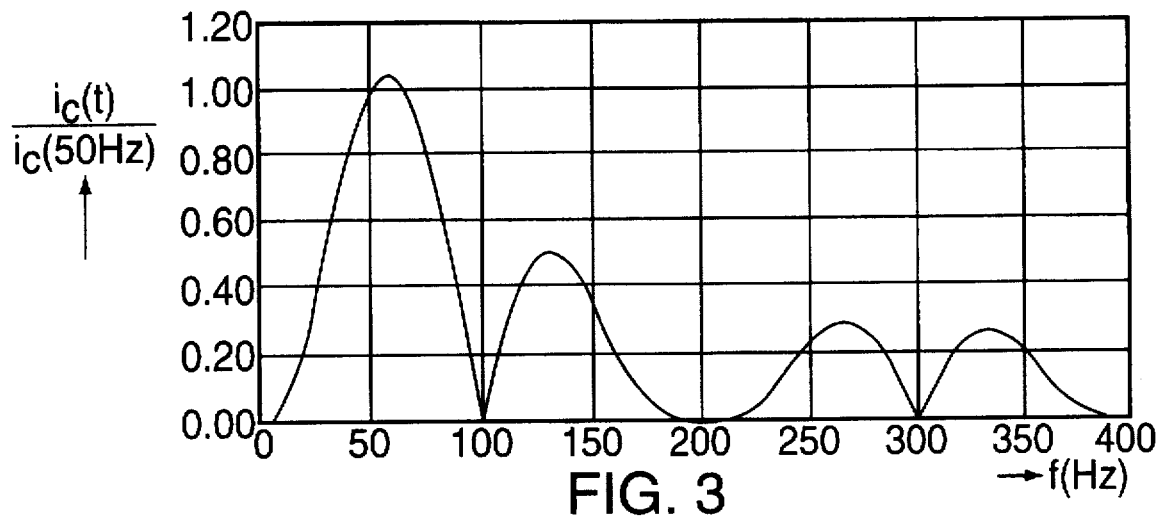
FIG. 3 shows the frequency response of the cosine filtering performed in FIG. 1.

FIG. 1 also shows that the digital current measurement values J(t) are also supplied to a cosine filter 19 (the frequency response of the cosine filter 19 is illustrated in FIG. 3), in which a current $i_c(t)$ is generated according to the relationship below (12):

$$I_c(t)=i_c(t-1)+J(t)-2J(t-\tfrac{1}{4}T)+2J(t-\tfrac{3}{4}T)-J_n(t-T) \quad (12)$$

The filtered current measurement values $i_c(t)$ are supplied to an absolute value generator 20, to which the sine-filtered current measurement values $i_s(t)$ are also supplied. In this absolute value generator 20 an absolute value $i_B(t)$ is generated according to the following equation (13):

$$i_B(t)=\sqrt{i_s(t)^2+i_c(t)^2} \quad (13)$$

Figure 4:
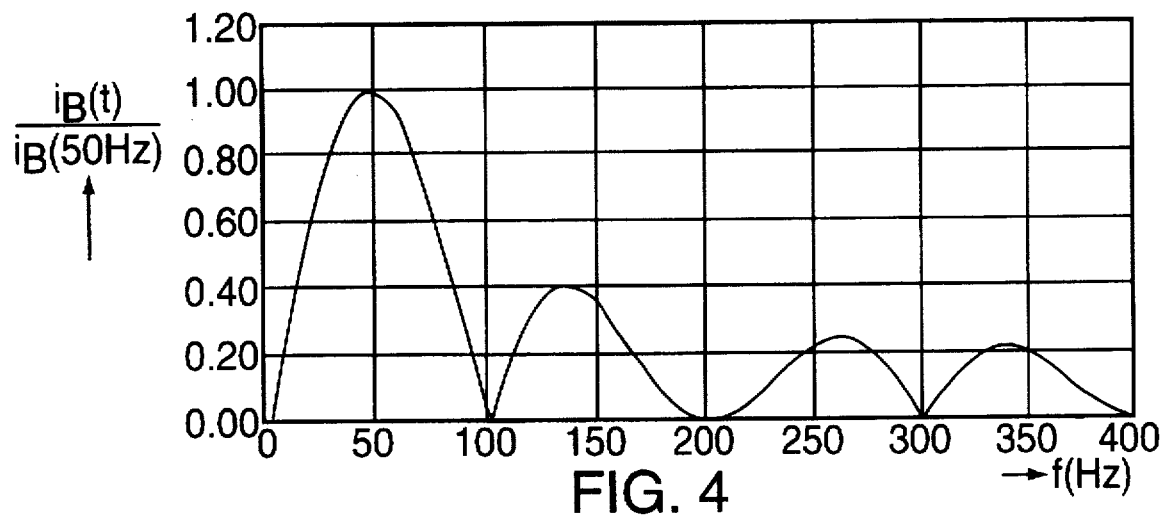
FIG. 4 shows the frequency response of the absolute value generation performed in FIG. 1.

Absolute value generator 20 also performs a low-pass filtering, so that at the output of absolute value generator 20 an absolute value measurement quantity $i_{BF}(t)$ appears, which can be described by the following equation (14) (the frequency response without taking into consideration low-pass filtering is shown by FIG. 4):

$$i_{BF}(t)=\frac{i_B(t)+i_B\left(t-\tfrac{1}{4}T\right)}{2} \quad (14)$$

In the following module 21, an absolute value comparison quantity $i^*_B(t)$ is generated using an absolute value reference measurement quantity, if the relationships of the following equations (15) and (16) are satisfied:

$$i^*_B(t)=i_{BF}(t)-i_{BF}(t-2T), \text{ if } i_{BF}(t-2T)<+I_{Bthresh} \quad (15)$$

$$i^*_B(t)=i_{BF}(t)-i_{Bthresh}, \text{ if } i_{BF}(t-2T)>+I_{thresh}. \quad (16)$$

In both of these equations (15) and (16), $I_{Bthresh}$ denotes a predefined current threshold value, while $i_{BF}(t-2T)$ denotes an absolute value reference measurement quantity, detected two current periods before. Equation (16) shows that the current threshold value $I_{Bthresh}$ is also used as an absolute value reference quantity.

A subsequent, additional threshold value device 22 checks whether the absolute value comparison quantity $i^*_B(t)$ is greater than a threshold value $I_{Bthresh}$, whose value is selected in conformance with the maximum load current of the line. If this is the case, then the output signal $S_B(t)$ of this additional threshold value device 22 is "1," which signals that the threshold value has been exceeded. The second threshold value device 16 then receives this output signal as a second exciting quantity $S_B(t)$.

If both exciting quantities $S_M(t)$ and $S_B(t)$ are present, then evaluation block 14 is enabled for evaluating the sign signals by being supplied with an output signal $S(t)$ from the second threshold value device 16. For this purpose further sign signals $G_p(t)$ and $G_n(t)$, transmitted by a device having the general design of the device illustrated in FIG. 1 to the other end (not illustrated) of line section 1 to be monitored, are needed; these sign signals are captured via a second data transmission section 23.

Evaluation block 14 contains as an essential component an electronic counter, whose count status $Z(t)$ is changed according to signals $S(t)$, $V_p(t)$, $V_n(t)$ $G_p(t)$, and $G_n(t)$ as shown in the last three columns of FIG. 5. In particular, this figure shows that, regardless of the sign signals $V_p(t)$, $V_n(t)$, $G_p(t)$, and $G_n(t)$, the counter is incremented by one when signal $S(t)$ is "0" and the count status was previously smaller than "0." If the count status $Z(t)$ was greater than "0" under the same circumstances, then the counter is decremented by "1." On the other hand, if signal $S(t)$ is "1," then the counter value is changed as shown in the next-to-last column of FIG. 5. This means that if the sign of $V_p(t)$ and $G_p(t)$ is positive, the counter is decremented by "8" for high triggering. If $V_p(t)$ is "1" if and $G_p(t)$ is "0," then the counter is decremented by "4" only, for low triggering. Otherwise high stabilization occurs through incrementation by "7" if $V_p(t) = 1$ and $G_n(t) = 1$. The behavior of the counter for other different sign combinations can be easily seen from the other lines of FIG. 5. In specific cases, the counter is set so that for a status $Z(t) = -13$ triggering occurs, which is signaled by the appearance of a signal at output 24. This signal can actuate a power switch not illustrated in the figure via known actuating contacts.

In a preferred embodiment for carrying out the process of the invention, the different modules 8 through 22 of the device of FIG. 1 are implemented by a data processing system.

What is claimed is:

1. A method of obtaining a triggering signal by comparing currents at ends of a section to be monitored of an electric power transmission path, wherein, at either end of said section to be monitored, each of a plurality of measurement quantities obtained from said currents is phase-selectively subjected to analog-to-digital conversion whereby digital current measurement values are obtained, and whereby first filtered current measurement values are obtained from said digital current measurement values via digital sine filtering the method comprising:

(a) generating an auxiliary measuring quantity by subtracting a stored current reference measurement value from a present value of said first filtered current measurement value;

(b) retaining a sign signal that denotes a sign of a present value of said auxiliary measuring quantity, said sign signal being evaluated at one end of said section to be monitored;

(c) transmitting said sign signal via a data transmission path to the other end of said section to be monitored where said sign signal is evaluated;

(d) obtaining a first exciting quantity if an absolute value of said auxiliary measuring quantity is greater than a predefined threshold value;

(e) subjecting said digital current measurement values to digital cosine filtering such that additional filtered current measurement values are obtained;

(f) generating an absolute value measuring quantity from said first and additional filtered current measurement values via absolute value generation and low-pass filtering operations;

(g) generating an absolute value comparison quantity by subtracting a stored absolute value measuring quantity from a present value of said absolute measuring quantity;

(h) comparing said absolute value comparison quantity with a first predefined threshold value, such that a second exciting quantity is obtained if an absolute value of the absolute value comparison quantity is greater than said first predefined threshold value; and (i) evaluating said sign signal and corresponding sign signals from said other end of said section to be monitored when both of said first and second exciting quantities are present.

2. The method of claim 1, wherein in step (g) said stored absolute value measuring quantity is an absolute measuring quantity that is detected two periods of said currents earlier if said absolute measuring quantity that is detected two periods of said currents earlier is less than a second, predefined absolute value threshold value, and said stored absolute value measuring quantity is said second, predefined absolute value threshold value if said absolute value measuring quantity that is detected two periods of said currents earlier is greater than said second, predefined absolute value threshold value.

3. The method of claim 1 wherein said first exciting quantity is suppressed if a difference between a present value of said digital current measurement values and a previous, stored value of said digital current measurement values is smaller than a predefined minimum value.

4. The method of claim 2 wherein said first exciting quantity is suppressed if a difference between a present value of said digital current measurement values and a previous, stored value of said digital current measurement values is smaller than a predefined minimum value.

* * * * *